March 23, 1965     W. E. ZRUBEK     3,174,336
FLUID FLOW INDICATOR

Filed Dec. 4, 1961     2 Sheets-Sheet 1

*INVENTOR.*
WILLIAM EDWARD ZRUBEK

BY
*ATTORNEYS*

INVENTOR.
WILLIAM EDWARD ZRUBEK

United States Patent Office 3,174,336
Patented Mar. 23, 1965

3,174,336
FLUID FLOW INDICATOR
William Edward Zrubek, Linthicum Heights, Md., assignor, by mesne assignments, to the United States of America as represented by the Secretary of the Navy
Filed Dec. 4, 1961, Ser. No. 157,023
2 Claims. (Cl. 73—189)

The present invention relates generally to improvements in fluid flow measuring apparatus and the like and more particularly to new and improved apparatus for measuring simultaneously both the velocity and direction of fluid flow with respect to a vessel located therein.

Those concerned with the development of systems for the launching of missiles from a submerged submarine have long recognized the need for a simple means for predicting the bending moment of the ocean currents on the missile as it emerges from a launching tube, that is, the effect of the transverse fluid pressure on the projected course of the missile. Ideally this prediction should be made available instantaneously to enable final adjustments in the missile guidance. The present invention fulfills these needs.

Pitot tubes which measure the differential pressure between the dynamic and static heads of a fluid have been utilized as speed indicators, but are relatively inaccurate and not readily adaptable for determination of the direction of fluid flow. Transducers operating on the principle of the variation in resistivity of resistors, such as platinum wires, with changes in temperature have been incorporated into revolvable devices for measuring the angle of attack of an airplane relative to the air stream. Since the velocity of air flow affects the temperature of the resistors, it is apparent that such devices would not be operative in liquids, such as the ocean. Double-button carbon transmitters, which are pressure-responsive devices, have also been used for indicating angle of attack of an airplane, but have required a revolvable scanning means involving reversible motors and complex circuitry. Furthermore, this angle of attack device did not, and could not, measure variations in fluid flow velocity. A device for measuring fluid flow is described in Patent No. 2,543,020, issued to P. D. Hess. This device utilizes a flexible mounted cylindrical rod probe which when moved by the fluid flow varies the current between a plurality of plates and a cathode of a vacuum tube. Not only does the Hess device require a delicate electron tube but the use of a flexible diaphragm mounting prevents uniform accuracy and sensitivity over a wide range of fluid flow. In addition, variations in the curved surface of the probe, caused by marine growth introduces substantial errors in the measurements obtained.

The general purpose of this invention is to provide a fluid flow indicator which enables the velocity and direction of a fluid flow to be measured instantaneously and simultaneously over a wide range by a simple, expedient, and accurate device. To attain this, the indicator utilizes a sturdy fixed arrangement of pressure-responsive transducers without resorting to revolvable scanning means or complex circuitry. One type of pressure-responsive transducer is filled with a substance whose electrical resistance varies with changes in density so that variations in the fluid pressure applied to pressure-responsive walls of said transducer produces variations in the electrical current. Said pressure-responsive walls may be of relatively large area, so that the effect of a foreign object located thereon is minimized. The transducers are connected in an electrical network whereby the velocity and direction of the fluid flow can be directly observed.

An object of the present invention is to provide a fluid flow measuring device of rugged construction that simultaneously indicates both direction and velocity of flow.

Another object is to utilize a fixed pressure-responsive type of transducer means for determination of the direction of fluid flow without the need for a complex scanning system.

A further object is to provide a velocimeter comprising a double-button type of transducer means.

A still further object of the invention is to utilize the electrical output of the flow measuring device as a computer input.

Still another object is to provide a device that predicts the bending moment of fluid flow on a missile to be launched from a submerged launching device.

Yet another object is to automatically orient a missile guidance means to compensate for the flow of water past a submerged launching device from which a missile is to be launched.

Other objects and many of the attendant advantages of this invention will be readily appreciated as the same become better understood by reference to the following detailed description when considered in connection with the accompanying drawings wherein.

Figure 1:
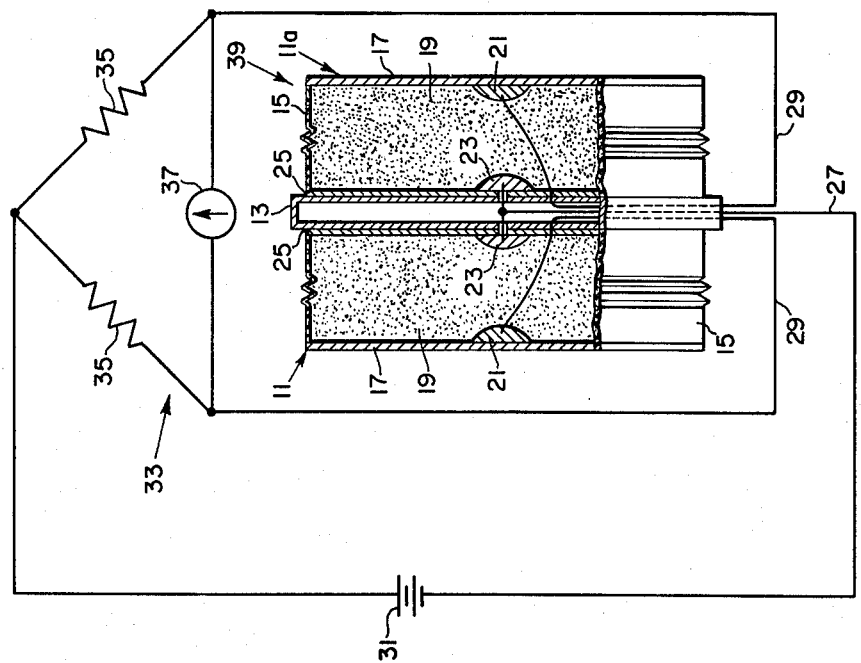
FIG. 1 is a diagrammatic view of a fluid flow indicator incorporating an enlarged transducing means for measuring fluid flow in a conduit and a circuit for indicating said flow.

Referring now to the drawings, wherein like reference numerals designate like or corresponding parts throughout the several views, there is shown in FIG. 1 a simple embodiment of a fluid flow indicator for determining the direction and velocity of flow of a fluid that is so confined that it can flow in only two directions, e.g., a fluid flowing in an unknown direction through a conduit. Two identical pressure-responsive transducers 11 and 11a are mounted back to back on a common support means 13, such as a hollow plate or the like. The transducers are illustrated as having a rectangular configuration, but can be constructed in any configuration that may be suitable for a particular installation. Each of the transducers comprises a fluid-tight container having a back wall which may be a part of support means 13, side walls 15 and a front wall 17. Side walls 15 support front wall 17 substantially parallel to support means 13. Either side walls 15 or front wall 17 are resilient. In the embodiment of FIG. 1 the former is so constructed. In this embodiment front wall 17 is made of a rigid material, such as metal or plastic, that resists corrosion in the fluid environment.

Each container is filled with a substance 19, such as carbon granules, whose resistance to the flow of electric current varies with changes in the density of the substance. In direct contact with variable resistance substance 19 are terminals 21 and 23, which are attached to front wall 17 and support means 13 respectively. Where support means 13 is made of a conducting material, terminals 23 must be insulated therefrom by means of insulating strips 25. One pair of terminals, 23 in FIG. 1, are jointly connected by a suitable conductor 27 to one side of a D.C. power source 31. The other pair of terminals, 21 in the embodiment shown, is connected by conductors 29 to the other side of power source 31 through resistive electrical bridge 33. The direction of electrical current flow between terminals 21 and 23 through substance 19 is immaterial. Reference resistors 35, forming the other two arms of the four-arm bridge 33 illustrated, are equal to each other. A meter 37, such as a zero-center galvanometer, is connected across the bridge.

The resiliency of the resilient transducer walls, side walls 15 in FIG 1, should be provided by construction (a bellows-type structure is shown) rather than by the use of elastic components. Elastic members tend to distort under pressure without reducing the volume of the container of which they are the side walls. Substance 19 offers less resistance to the flow of electric current when the granules of said variable resistance substance are compressed together tightly, i. e., the substance is more dense, because the electric current follows a shorter path between terminals 21 and 23. Therefore, compression of the transducer under increased fluid pressure and, conversely, its resilient expansion upon relaxation of said pressure cause measurable variations in the flow of electric current proportional to said pressure.

The mounting of identical transducers 11 and 11a back to back serves a twofold purpose. It makes possible an immediate determination of the direction of flow from either of opposite directions. The direction of deflection of the pointer of meter 37 from zero center indicates which transducer is being subjected to the dynamic pressure of the flowing fluid. Also, the variations in electrical current caused by transducers so positioned provide a measure of the difference between the total pressure and static pressure of the fluid whose flow is being measured, which is a true measure of the pressure caused by the fluid velocity. Both transducers 11 and 11a are subjected simultaneously to the static pressure of the fluid being measured, but only that transducer whose front wall 17 is facing in the direction from which the fluid is flowing will be affected by the dynamic pressure caused by velocity. This invention measures the difference between the fluid pressures exerted on the transducers, therefore the static pressure, which is equal on both transducers, cancels out. The difference in potential between the branches of electrical bridge 33, caused by the difference in resistivity of substance 19 in transducers 11 and 11a, is indicated by meter 37. Said meter may be calibrated in convenient units, such as feet per second or knots. Such calibration is possible because the velocity of flow is proportional to the square root of the pressure of the flowing fluid. Where the fluid flow is through a conduit of known cross-sectional area, the meter can be calibrated to give volume of flow per unit time in addition to or instead of velocity. If the resistance change of a particular variable resistance substance 19 is not linear with the square root of pressuure, the inside surfaces of front walls 17 or the calibration of meter 37 may be made to compensate for the non-linearity. Obviously, transducers 11 and 11a need not be mounted on a common support means 13. Important characteristics of the arrangement shown in FIG 1 are that the respective front walls 17 of the two transducers are parallel to and facing away from each other and substantially perpendicular to the axis of fluid flow.

The transducers may be enclosed in a suitable housing, not shown, such housing serving to protect the transducers and, if it is advantageous to make side walls 15 of a flexible material that might yield when directly exposed to fluid pressure, said housing may be constructed so that only front walls 17 are exposed to the fluid. In cases where the magnitude of hydrostatic pressure might reduce the range of the transducers, compensating plates or springs in a plane perpendicular to the front walls may be used.

Figure 2:
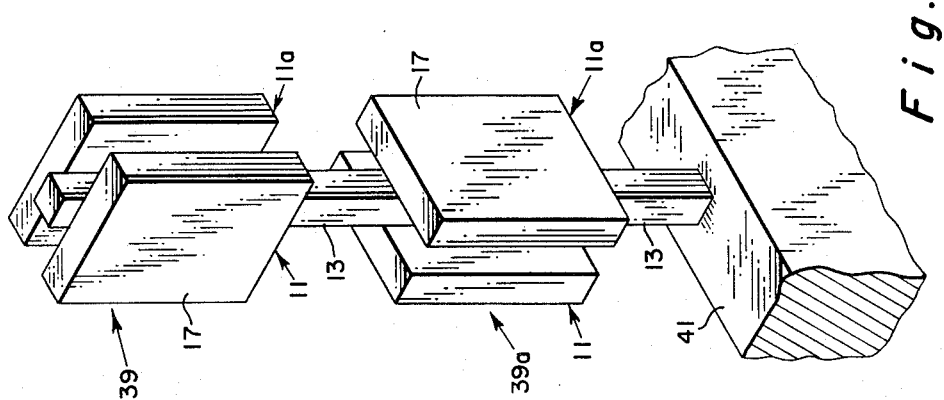
FIG. 2 is an isometric view of an embodiment of a transducing means of a fluid flow indicator for measuring quadrature components of a fluid flow.

FIG. 2 illustrates another arrangement of the transducing means which makes possible an extremely rapid simultaneous determination of both velocity and direction of unconfined fluid flow, such as ocean or air currents. Numeral 39 represents a pair of identical pressure-responsive transducers 11 and 11a mounted back to back on a common support means 13. A similar second pair of transducers 39a is mounted back to back on the common support means 13 at right angles to, and vertically spaced from, the first pair. The embodiment of FIG. 2 is suitable for fixedly mounting to an underwater surface 41 of a vessel (not shown), said fixed position being in known orientation with an axis of said vessel. Quadrature components of ocean current flow are obtained by this embodiment, in a manner presently to be described with reference to FIG. 3. Instead of mounting transducer pairs 39 and 39a above each other on a common support means 13, they can be fixedly secured individually to the surface 41 of the vessel, however, in either construction it is important that they be disposed at right angles to each other for the invention to operate most simply and accurately in measuring quadrature components of fluid flow. In either embodiment the pairs of transducers should be spaced sufficiently apart so that turbulence caused by the fluid flow over one transducer pair will not affect the fluid flow over the other pair.

It is important in this embodiment that the exposed outer surface of each front wall 17 be planar and rigid so that the fluid pressure on said wall, regardless of the direction of fluid flow, is uniform over its entire area. Furthermore, this allows only that component of fluid force perpendicular to said outer surface to compress the variable resistance substance contained within the transducer.

Virtually all applications requiring a determination of the velocity and direction of fluid flow relative to an object located in said fluid require a measurement of only the quadrature components of fluid flow in a single plane, usually horizontal. In a situation where components of flow in yet another plane, such as vertical, must be measured, a third pair of back to back transducers may be placed in a fixed position with front walls 17 perpendicular to said plane.

Figure 3:
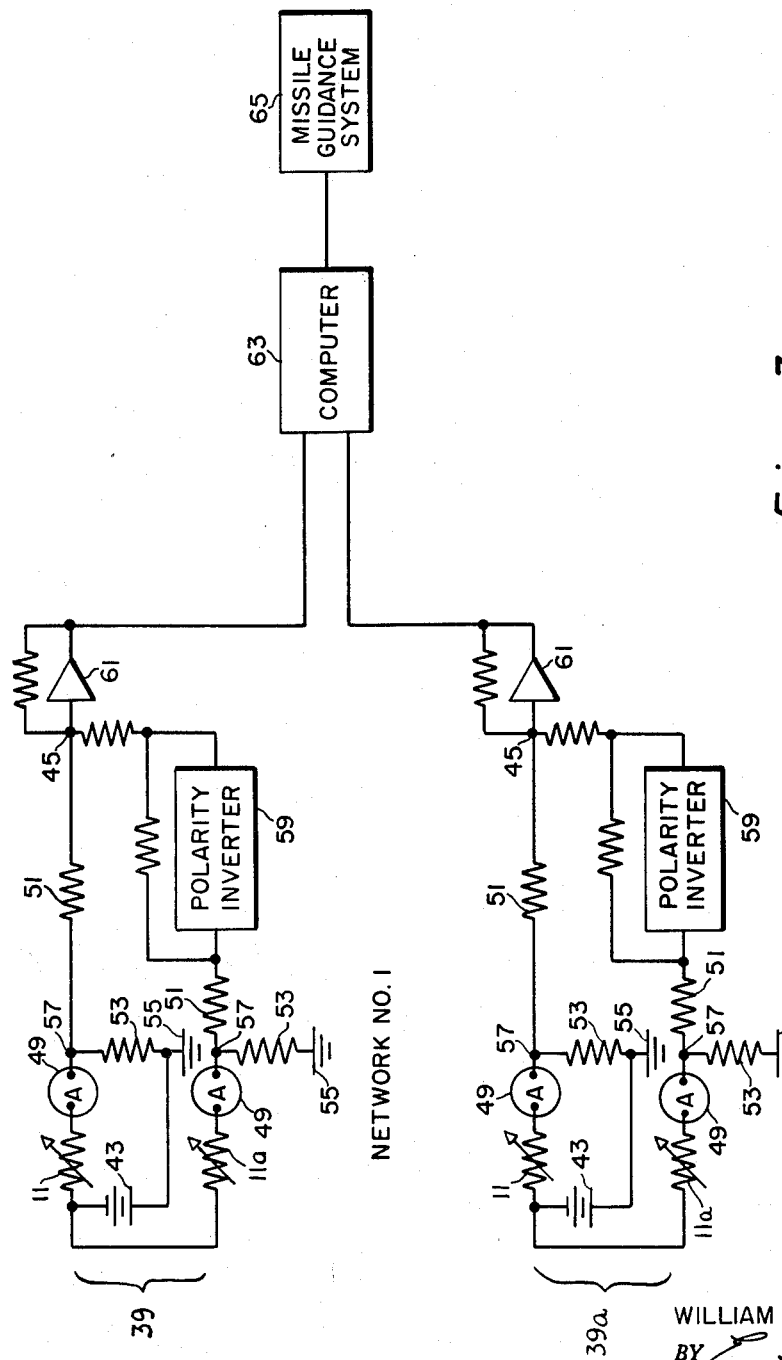
FIG. 3 is a schematic view of a fluid flow indicator arranged in a guidance circuit for a submerged missile.

As previously noted, in FIG. 3 the transducer pairs 39 and 39a are arranged in a circuit whereby the velocity and direction of ocean current flow can be utilized to automatically insert guidance corrections to a missile to be launched from a submerged launching device, thereby compensating for the bending moment to be exerted on the missile by said flow.

The circuit of FIG. 3 comprises two electrical networks, each transducer pair 39 and 39a being included in a separate network, labeled Networks No. 1 and No. 2 in the drawing. In turn, each network comprises two branches, each branch connected at its ends to a common D.C. power source 43 and a summing point 45. Included in each branch are one of the transducers, symbolically represented by resistors having the designations 11 or 11a which resistors correspond to transducers 11 and 11a shown in FIG. 2, an ammeter 49 for calibrating the transducer and an isolator resistor 51. A reference resistor 53 and ground 55, which provides a common reference, are connected into each branch at point 57. The polarity of the voltage in one branch of each network is reversed by a polarity inverter 59. The outputs of both branches comprising a network combine at summing point 45, from where said combined output is amplified at 61. The outputs of both networks are simultaneously fed into a computer means 63 connected to a missile guidance system 65.

The purpose of polarity inverter 59 is to reverse the polarity of the voltage in its network branch, as compared to the voltage in the other branch, so that the output of amplifier 61 represents the difference in potential between the branches, caused by the unequal fluid pressures exerted on the respective transducers of each pair (39 or 39a) rather than the sum of the total fluid pressure exerted on said transducers. The polarity of each network output indicates which of the two transducers of each respective pair is being subjected to dynamic fluid pressure, thereby indicating from which of opposite directions with respect to each pair the flow is coming. The magnitude of the output is a measure of the pressure exerted by the fluid velocity. Each respective amplifier 61 amplifies the output of its network to be suitable as input for computer means 63, such as an analog computer.

The computer resolves the two outputs of the electrical networks into resultant values of velocity and direction of fluid flow measured in a plane perpendicular to the front faces of the transducers. In the combination shown in FIG. 3 the output of computer 63 may be a prediction of the bending moment that the ocean currents will exert upon a missile to be launched from a submerged launching device. In turn, guidance means 65 may automatically aim the launching tube of a nonguided missile or orient a guide missile to compensate for the deviation from course so predicted. If the predicted bending moment is too high, the firing circuit may be opened automatically.

The indicator of FIG. 3 employing Networks No. 1 and No. 2 measures quadrature components of fluid flow in a single plane perpendicular to the front walls of the transducers. If it is desired to measure components of fluid flow in a plurality of planes, a third network may be added, similar to Networks No. 1 and No. 2, wherein the respective pair of transducers are fixedly mounted with their front walls lying in a plane perpendicular to planes containing the front walls of the other two pairs of transducers. In such a case the output of the third network is also applied to computer 63 to obtain the three-dimensional value of fluid flow direction and velocity.

It is apparent that the fluid flow indicator of this invention makes possible a determination of both fluid flow velocity and direction in a manner heretofore not achieved. This result is acomplished simultaneously and instantly over a wide range of values with a high degree of accuracy and therefore is suitable for missile launchings. The invention indicator utilizes fixed pressure-responsive transducers having therein a substance whose electrical transmission varies with the pressure of the fluid flow exerted upon their pressure-responsive walls. In the most advantageous arrangement, the transducers are disposed in pairs in back to back relationship with each pair being in mutually perpendicular arrangement with the other pairs. The indicator is made simple and rugged by eliminating sensitve components, such as vacuum tubes, as well as cumbersome scanning drive mechanisms relying on motors and the like.

Obviously many modifications and variations of the present invention are possible in the light of the above teachings. It is, therefore, to be understood that within the scope of the appended claims the invention may be practiced otherwise than as specifically described.

I claim:
1. A device for providing information which can be utilized to determine velocity and direction of flow of a fluid without emission of any alternating current signal comprising:
   at least two transducers each having a walled fluid-tight container;
   at least part of one wall of each container being pressure-responsive;
   said containers being completely filled with a substance whose resistance to the flow of electric current varies with changes in the density of said substance;
   said transducers being suitably oriented with respect to the possible directions of fluid flow;
   a source of direct current
   an electric circuit connected to the source of direct current and having a plurality of branch circuits each of which includes one of said transducers and means for measuring the difference in potential in said branch circuits; and
   said transducers properly oriented with respect to each other so as to cancel current signals caused by sources common to each;
   whereby the measured potentials provide information which can be utilized to determine said velocity and direction of flow.

2. A device for providing information which can be utilized to determine relative velocity and direction of flow to water with respect to a vessel without emission of any alternating current signals comprising:
   a plurality of pairs of pressure-responsive transducers filled with a susbtance whose resistance to the flow of electric current varies with changes in the density of said substance;
   suport means for holding said pairs of transducers submerged in the water and in known orientation with an axis of said vessel;
   the transducers of each pair being parallel and having pressure-responsive front walls facing away from each other and in planes suitable for response to velocity components of the flow of the water to be measured;
   a source of direct electric current;
   an electric network for each pair of transducers, said network connected to said source of current;
   each transducer forming part of a branch of said network; and
   means for reversing the polarity of one branch so that the output of said network is the difference in potential between the branches of the network, and represents a directional component of said velocity oriented with respect to said axis and compensated for water pressure on the transducers due to their depth within the water;
   whereby said outputs can be utilized for determining said velocity and direction flow.

References Cited by the Examiner

UNITED STATES PATENTS

| | | | |
|---|---|---|---|
| 1,953,819 | 4/34 | Payne | 73—189 |
| 2,315,756 | 4/43 | Warner | 73—182 |
| 2,512,278 | 6/50 | Jones | 73—182 |
| 2,701,474 | 2/55 | Goudy | 73—189 |
| 2,896,449 | 7/59 | Turner | 73—194 |

RICHARD C. QUEISSER, *Primary Examiner.*

ROBERT L. EVANS, *Examiner.*